April 24, 1928.
O. SANDS ET AL
1,667,438
WAGON BODY SHOVELING BOARD
Filed March 27, 1926
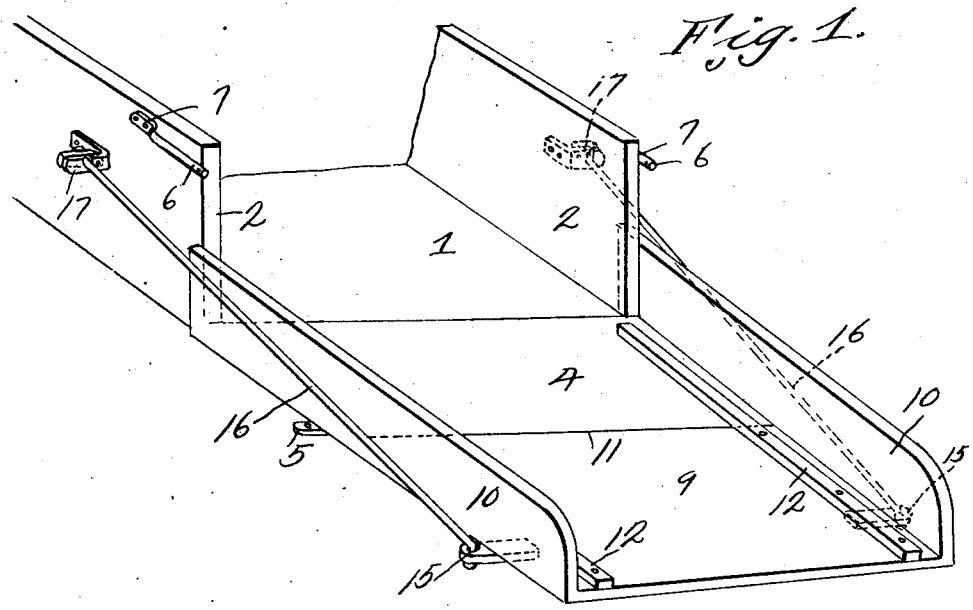
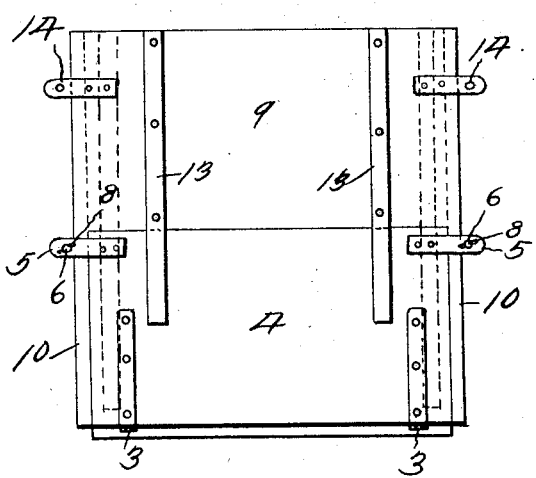
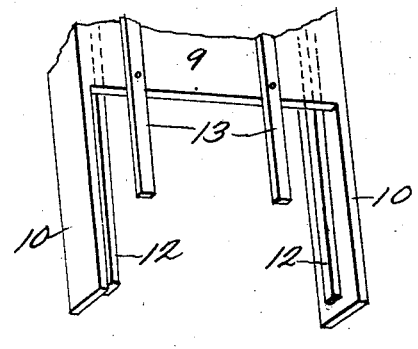
Inventors
O. Sands and
C. Eustice
By Philip A. H. Ferrell
Attorney Patented Apr. 24, 1928.

1,667,438

UNITED STATES PATENT OFFICE.

ORVILLE SANDS AND CHARLES EUSTICE, OF CUBA, WISCONSIN.

WAGON-BODY SHOVELING BOARD.

Application filed March 27, 1926. Serial No. 97,882.

The invention relates to end gate shoveling boards for wagon bodies and has for its object to provide a device which may be easily and quickly attached to a conventional form of end gate without changing the construction thereof, whereby said end gate may be easily converted into a shoveling board having side walls.

A further object is to provide a shoveling board comprising a flat body member adapted to rest on the upper edge of the end gate and provided with cleats engaging the inner and outer sides of the end gate for maintaining the board and end gate in the same plane. Also to provide the opposite sides of the shoveling board with flanges, which flanges engage opposite ends of the end gate and prevent lateral displacement of the board in relation to the end gate and at the same time forming side boards extending to the side boards of the wagon body, and engaging the outer sides thereof.

A further object is to space the inner cleats from the side members whereby when the end gate and shovel is in closed position the ends of the side boards of the body will be received between the cleats and the side boards of the end gate and shoveling board.

A further object is to provide rods connected to the shoveling board and slidably connected in brackets carried by opposite sides of the wagon body and forming means whereby the shoveling board will be supported when in open position.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a perspective view of the shovel board attached to an end gate.

Figure 2 is a view in elevation of the shovel board and the end gate in closed position.

Figure 3 is a detail perspective view of a portion of the end gate and the shovel board shown in the position to be assembled.

Referring to the drawing, the numeral 1 designates the rear end of a conventional form of wagon and 2 the vertical sides thereof. Hingedly connected at 3 to the rear end of the body 1 is a conventional form of end gate 4, the opposite ends of which are provided with outwardly extending brackets 5, having apertures therein and which brackets receive the shafts 6 of the brackets 7 secured to the outer sides of the sides 2 of the body 1, and which shafts 6 are provided with removable pins 8, which are placed through the shafts after the end gate 4 is closed and hold said end gate in closed position.

Disposed in the plane of the end gate 4 is a shovel extension 9, which shovel extension has its opposite sides provided with upwardly extending side members 10, which extend beyond the edge 11 of the shovel extension and engage opposite sides of the end gate 4 and prevent lateral displacement of the extension 9 in relation to the end gate 4 and form side boards for the end gate. The side members 10 extend to a position where they overlie the outer sides of the side boards 2 of the wagon body, therefore it will be seen they are disposed in planes where they will not interfere with the closing of the end gate with the board thereon when so desired. Secured to the inner side of the shovel extension 9 and spaced from the side members 10 are cleats 12, which terminate adjacent the hinged side of the end gate 4, and engage the inner side of the end gate. Cleats 12 by being spaced from the side members 10 allow the ends of the side boards 2 of the wagon body to be received between the cleats and the side members 10, and assist in bracing the device and at the same time the cleats are positioned where they will not interfere with the closing of the end gate with the shovel extension thereon. Secured to the outer side of the shovel extension 9 are cleats 13, which cleats overlie the outer side of the end gate 4, and in connection with the cleats 12 maintain the shovel extension 9 in the plane of the end gate at all times. It will be seen that the end gate structure is not modified in any way, and the shovel extension may be easily applied thereto. Extending outwardly from opposite sides of the shovel extension 9 are arms 14, to which are pivotally connected at 15 upwardly inclined brace rods 16, and which brace rods are held by latching members 17 carried by the outer sides of the side boards 2 of the wagon body. Brace rods 16 not only brace and support the end gate and the shovel attachment, but support the same in a manner whereby a considerable load may be disposed on the shovel extension and outward movement of the shovel extension when the same is in operative position as shown in Figure 1 is prevented.

From the above it will be seen that a shovel extension is provided for end gates of wagons, which extension may be easily and quickly applied to the end gate without varying the construction thereof, and the side members 10 of the extension also form side members for the end gate 4. It will also be seen that the end gate with the shovel extension thereon may be closed without interference from the shovel extension.

The invention having been set forth what is claimed as new and useful is:—

The combination with a wagon end gate, a wagon body, side members carried by the wagon body, said end gate being higedly connected to the wagon body, of a shovel extension engaging the free end of the end gate in the plane thereof, side members carried by the shovel extension, said side members engaging opposite ends of the end gate and the outer sides of the wagon body sides, cleats carried by the inner side of the shovel extension and spaced from the side members thereof whereby when the end gate is closed said cleats will be received between the side members of the wagon body, cleats carried by the outer side of the shovel extension, all of said cleats engaging opposite sides of the end gate.

In testimony whereof we hereunto affix our signatures.

ORVILLE SANDS.
CHARLES EUSTICE.